United States Patent
Chiba et al.

(10) Patent No.: US 7,589,784 B2
(45) Date of Patent: Sep. 15, 2009

(54) IMAGE DEVICE AND ASSOCIATED METHODOLOGY OF ADJUSTING A FLASH EXPOSURE OPERATION

(75) Inventors: Takuya Chiba, Tokyo (JP); Kazato Tanaka, Tokyo (JP); Naoki Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 589 days.

(21) Appl. No.: 10/567,578

(22) PCT Filed: Jun. 8, 2005

(86) PCT No.: PCT/JP2005/010489

§ 371 (c)(1),
(2), (4) Date: Feb. 8, 2006

(87) PCT Pub. No.: WO2005/125185

PCT Pub. Date: Dec. 29, 2005

(65) Prior Publication Data
US 2008/0165265 A1    Jul. 10, 2008

(30) Foreign Application Priority Data
Jun. 16, 2004    (JP)    ............... 2004-177910

(51) Int. Cl.
H04N 5/222    (2006.01)
H04N 3/14    (2006.01)
H04N 5/335    (2006.01)
G03B 15/03    (2006.01)

(52) U.S. Cl. .................. 348/371; 348/308; 396/157
(58) Field of Classification Search ............ 348/371, 348/370, 308; 396/155, 157
See application file for complete search history.

(56) References Cited

U.S. PATENT DOCUMENTS 6,069,659 A * 5/2000 Nakajima .................. 348/371

(Continued)

FOREIGN PATENT DOCUMENTS

| EP | 1 263 215 A2 | 12/2002 |
| JP | 2000-196951 | 7/2000 |
| JP | 2001-285720 | 10/2001 |

OTHER PUBLICATIONS

XP002344566—CCD vs. CMOS: Facts and Fiction; "Choosing an imager means considering not only the chip, but also its manufacturer and how your application will evolve." by Dave Litwiller; pp. 1-4; Reprinted from the Jan. 2001 issue of Photonics Spectra© Laurin Publishing Co. Inc.

(Continued)

*Primary Examiner*—John M Villecco
(74) *Attorney, Agent, or Firm*—Oblon, Spivak, McClelland, Maier & Neustadt, L.L.P.

(57) ABSTRACT

An image pickup device and associated methodology are provided. The image pickup device is formed from a plurality of pixels, each of which can perform any of an exposure operation and a reading operation thereof at a timing different from that of the other, an imaging apparatus is provided, which can determine the amount of main-flashing light based on pre-flashing by a flash highly accurately. Before and during a preflash operation by a flash unit, an exposure operation is started simultaneously for all the pixels of the image pickup device 14 to form an image before and during the preflash to obtain a detected value by a detector before and during the preflash, respectively. A computation circuit computes a differential detected value obtained by subtracting the before-preflash detected value from the during-preflash detected value. The differential detected value is a detected value containing only pre-flashed light with ambient light excluded. An amount of light for main flashing is computed on the basis of the differential detected value.

4 Claims, 12 Drawing Sheets

U.S. PATENT DOCUMENTS

| | | | |
|---|---|---|---|
| 6,154,612 A * | 11/2000 | Iwasaki | 396/157 |
| 6,441,856 B1 * | 8/2002 | Sugimoto | 348/371 |
| 6,546,203 B2 * | 4/2003 | Hofer | 348/371 |
| 6,650,834 B2 * | 11/2003 | Ume | 348/371 |
| 6,684,028 B2 * | 1/2004 | Shimada | 348/371 |
| 6,961,093 B2 * | 11/2005 | Higuchi | 348/371 |
| 7,129,983 B2 * | 10/2006 | Rantanen et al. | 348/371 |
| 7,145,602 B2 * | 12/2006 | Shiga | 348/370 |
| 7,148,922 B2 * | 12/2006 | Shimada | 348/371 |
| 7,274,009 B2 * | 9/2007 | Huang et al. | 250/208.1 |
| 7,423,674 B2 * | 9/2008 | Takeshita | 348/223.1 |
| 7,428,378 B1 * | 9/2008 | Warpakowski Furlan | 348/371 |
| 2002/0197071 A1 | 12/2002 | Hofer | |
| 2003/0063907 A1 * | 4/2003 | Muramatsu | 396/157 |
| 2003/0206235 A1 | 11/2003 | Suzuki | |
| 2005/0001926 A1 * | 1/2005 | Lee et al. | 348/371 |

OTHER PUBLICATIONS

XP007907620—Eastman Kodak Company (Technical Data); Kodak Digital Science KAC-0311 Image Sensor; Aug. 5, 2002; Revision No. 1; pp. 1-56.

* cited by examiner

IMAGE DEVICE AND ASSOCIATED METHODOLOGY OF ADJUSTING A FLASH EXPOSURE OPERATION

TECHNICAL FIELD

The present invention relates to an imaging apparatus for forming images by firing a flash.

BACKGROUND ART

An imaging apparatus is known which, for flash imaging, fires a preflash, and detects reflected light from an object to determine an amount of main-flashing light. Imaging apparatus mainly use a CCD (Charge Coupled Device) image sensor as their image pickup device. Recently, amid the growing trend toward a higher density of pixels on image pickup devices, a CMOS image sensor is drawing attention as a new type of image pickup device. The CMOS image sensor has advantages such as random access to and high-speed reading of pixel signals, high sensitivity, low power consumption, and the like.

However, in a conventional imaging apparatus using a CMOS image sensor, exposure operation and reading operation are performed differently for each pixel, and when a preflash is fired, preflash effects are given only to a part of the image pickup device, posing a problem of difficulty in determining the amount of main-flashing light accurately enough. In order to overcome this problem, an apparatus has been provided which applies a sufficiently long preflash exposure time (see, e.g., Patent Document 1 (Japanese Patent Application Publication No. 2000-196951).

DISCLOSURE OF THE INVENTION

However, when the imaging apparatus applying a sufficiently long preflash exposure time fires a preflash under ambient light, the amount of light entering a certain zone of the CMOS image sensor may sometimes exceed a dynamic range of the CMOS image sensor, producing image signals exhibiting improper levels from that zone, and thus leaving unsolved the problem of the difficulty in determining the amount of main-flashing light accurately enough.

The present invention has been made in view of such circumstances, and an object thereof is to provide an imaging apparatus capable of determining the amount of main-flashing light based on pre-flashing by a flash highly accurately, even using an image pickup device formed from a plurality of pixels, each of which can perform any of its exposure operation and reading operation at a timing different from that of the other, such as an XY addressable image sensor, notably a CMOS image sensor.

In order to achieve the above object, an imaging apparatus of the present invention includes a flash for emitting light onto an object, an image pickup device formed from a plurality of pixels, each of which can perform any of an exposure operation and a reading operation thereof at a timing different from that of the other, a detector circuit for detecting a brightness of image information formed by the image pickup device, and a control circuit for controlling operations of the image pickup device and of the detector circuit. In the imaging apparatus, the control circuit causes the flash to fire a preflash before a main-flashing operation by the flash, causes the image pickup device to form an image at the time of the preflash, and causes the detector circuit to detect the brightness of image information formed at the time of the preflash, to compute an amount of main-flashing light to be fired by the flash on the basis of the detected brightness of the image information formed at the time of the preflash. The control circuit is characterized by starting the exposure operation simultaneously for all the pixels of the image pickup device at the time of the preflash by the flash, whereby to form the image at the time of the preflash.

BEST MODES FOR CARRYING OUT THE INVENTION

In order to achieve the object of determining the amount of main-flashing light based on pre-flashing by a flash highly accurately, an imaging apparatus is configured such that an exposure operation is started simultaneously for all pixels of its image pickup device at the time of a preflash operation to form an image at the time of the preflash.

Embodiment 1

An imaging apparatus according to Embodiment 1 of the present invention will be described below with reference to the drawings.

Figure 1:
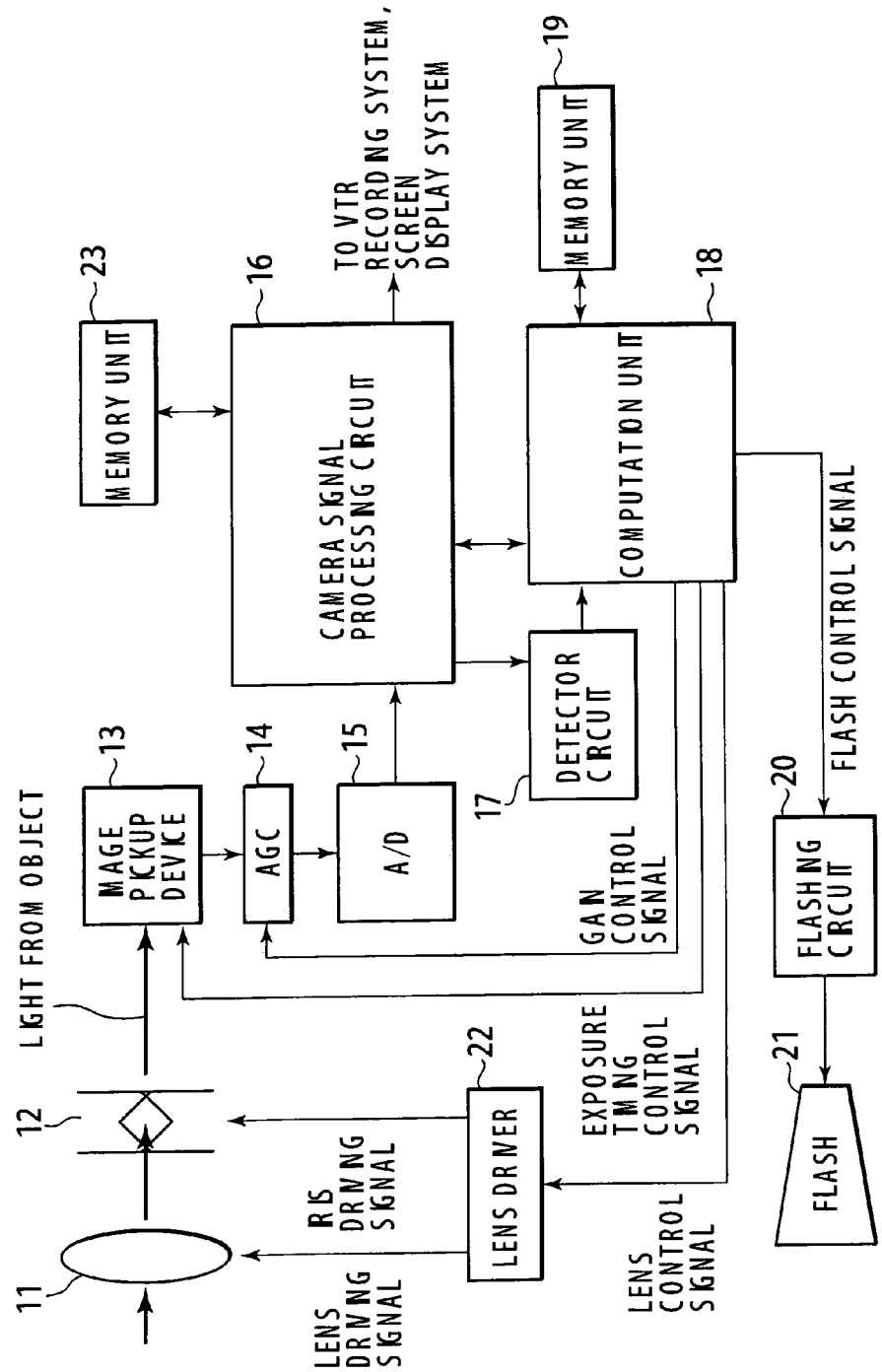
FIG. 1 is a diagram showing a general configuration of an imaging apparatus according to Embodiment 1.

FIG. 1 is a diagram showing a general configuration of the imaging apparatus according to Embodiment 1.

As shown in FIG. 1, the imaging apparatus according to Embodiment 1 includes a lens 11, an iris 12, an image pickup device 13, an AGC (Auto Gain Controller) 14, an A/D converter 15, a camera signal processing circuit 16, a detector circuit 17, a computation unit 18, a memory unit 19, a flashing circuit 20, a flash 21, a lens driver 22, and a memory unit 23.

The lens 11 passes light from an object therethrough for focusing onto the image pickup device 13, during imaging. The iris 12 changes its aperture to optimize the amount of light entering through the lens 11, for the sensitivity of the image pickup device 13. Also, the iris 12 functions as a shutter. The image pickup device 13 includes a plurality of pixels with R, G, B color filters arranged therefor, and photoelectrically converts the light having entered each of the pixels through the lens 11 into an analog signal (charge). Moreover, the image pickup device 13 is formed from an XY addressable image sensor, such as, e.g., a CMOS image sensor, and is configured such that each of the plurality of pixels perform any of its exposure operation and reading operation at a different timing. The CMOS image sensor is advantageous in terms of its low power dissipation and high-speed reading.

The AGC 14 amplifies video signals generated by the image pickup device 13. The A/D converter 15 converts the analog video signals amplified by the AGC 14 into digital video signals. The camera signal processing circuit 16 performs various signal processing, so far well known, on the digital video signals converted by the A/D converter 15, and includes, e.g., a white balance circuit, a Y/C separation circuit, a filtering circuit, an aperture controller, a gamma correction circuit, and the like, all not shown. The detector circuit 17 detects distributions within the screen of brightnesses and colors contained in the video signals processed by the camera signal processing circuit 16. A detected value indicative of brightness is, e.g., the integral of the pixel brightness signal levels within the screen.

The computation unit 18 is formed from, e.g., a microcomputer, and controls various parts of the present apparatus on the basis of the brightness and color distributions detected by the detector circuit 17 and the video signals processed by the camera signal processing circuit 16. The computation unit 18 computes and outputs, e.g., an exposure timing control signal for controlling the exposure operation and the reading operation by each pixel of the image pickup device 13, a gain control signal for controlling the gain of the AGC 14, a lens control signal for controlling the focusing of the lens 11 and the aperture of the iris 12 via the lens driver 22, and a flash control signal for controlling the firing operation of the flash 21 via the flashing circuit 20. The memory unit 19 stores control data computed by the computation unit 18.

The flashing circuit 20 drives the flash 21 in accordance with the flash control signal computed by the computation unit 18, for flash imaging. The flash 21 is lit in accordance with a driving signal from the flashing circuit 20. The lens driver 22 drives the lens 11 and the iris 12 in accordance with the lens control signal computed by the computation unit 18. The memory unit 23 temporarily stores the video signals (e.g., moving image information) processed by the camera signal processing circuit 16.

Figure 2:
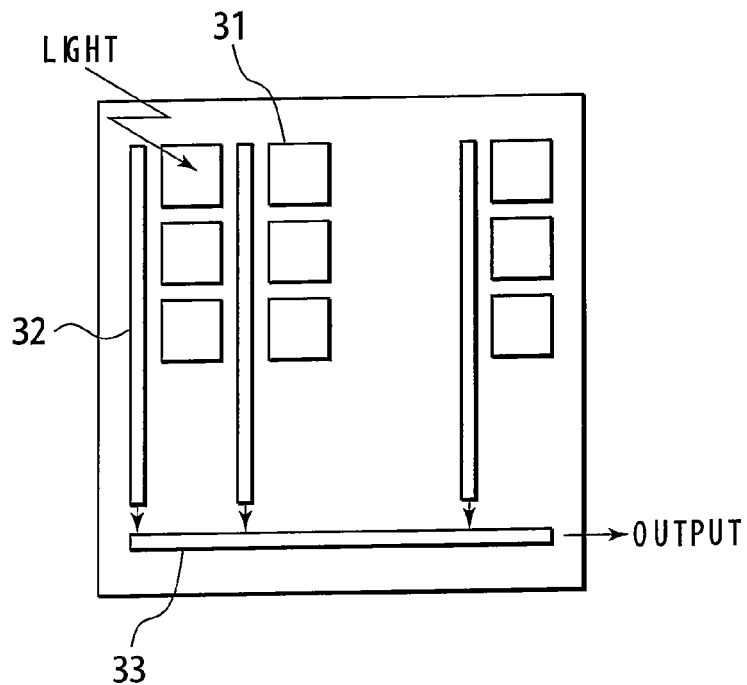
FIG. 2 is a diagram of a general configuration of a CCD image sensor.
Figure 3:
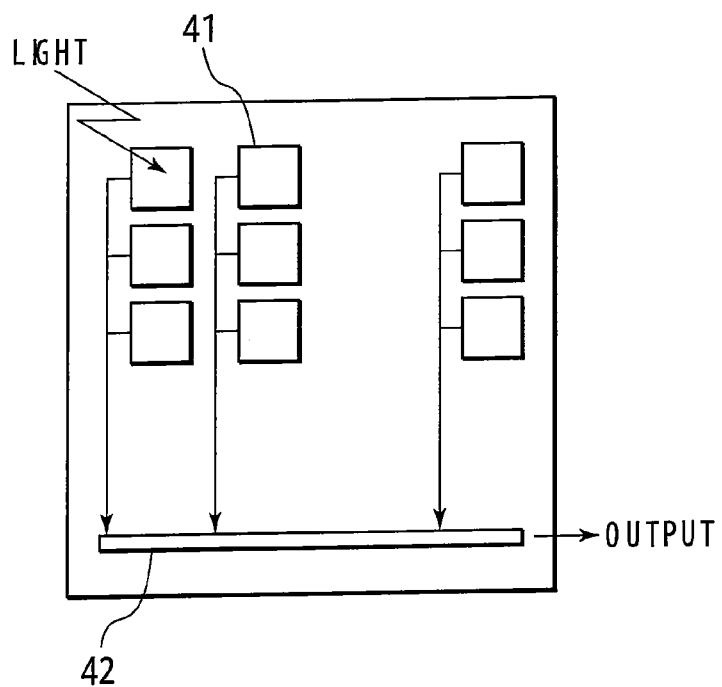
FIG. 3 is a diagram of a general configuration of a CMOS image sensor.

FIG. 2 is a diagram of a general configuration of a CCD image sensor, and FIG. 3 is a diagram of a general configuration of a CMOS image sensor.

As shown in FIG. 2, the CCD image sensor includes a plurality of pixels 31 arranged in a two-dimensional matrix-like configuration, as many V transfer registers 32 as the number of columns of the plurality of pixels 31, and an H transfer register 33. Each pixel 31 photoelectrically converts incident light into an analog video signal (charge). The plurality of V transfer registers 32 transfer the photoelectrically converted pixel video signals, respectively, i.e., vertically for each pixel (each line). The V transfer register 32 transfers the video signals for as many pixels 31 as one line transferred from the plurality of V transfer registers 32, horizontally for each pixel.

When the CCD image sensor is exposed to light, the light rays having entered the pixels are photoelectrically converted into charges (video signals), respectively. Each pixel 31 starts storing charge in an amount proportional to its incident light. When the CCD image sensor is given a signal for transferring the charge, the charges respectively stored in all the pixels 31 are transferred simultaneously to their respective V transfer registers 32. The charges in the pixels 31 (lines) transferred to the respective V transfer register 32 are transferred vertically for each pixel (each line), to the H transfer register 33. The video signals for as many pixels as one line transferred to the H transfer register 33 are then transferred horizontally and outputted therefrom, for each pixel. The plurality of V transfer registers 32 and the H transfer register 33 are light-shielded. As a result, the pixel 31 charges once transferred thereto are kept constant, unexposed from light from outside.

As shown in FIG. 3, the CMOS image sensor includes a plurality of pixels 41 arranged in a two-dimensional matrix-like configuration wherein pixels 41 in each column are electrically connected together, and a column 42 that transfers charges (video signals) transferred from any of the pixels 41 belonging to each column, horizontally for each pixel. The CMOS image sensor does not have a component corresponding to the V transfer registers 32 in the CCD image sensor. Thus, each pixel 41 of the CMOS image sensor may have a larger surface area than each pixel 31 of the CCD image sensor. Therefore, its dynamic range can be increased to improve its sensitivity. The CMOS image sensor can be configured to selectively read pixels 41 at desired addresses. On the other hand, it cannot read pixels 41 belonging to the same column simultaneously, which complicates their exposure and reading operations.

Figure 4:
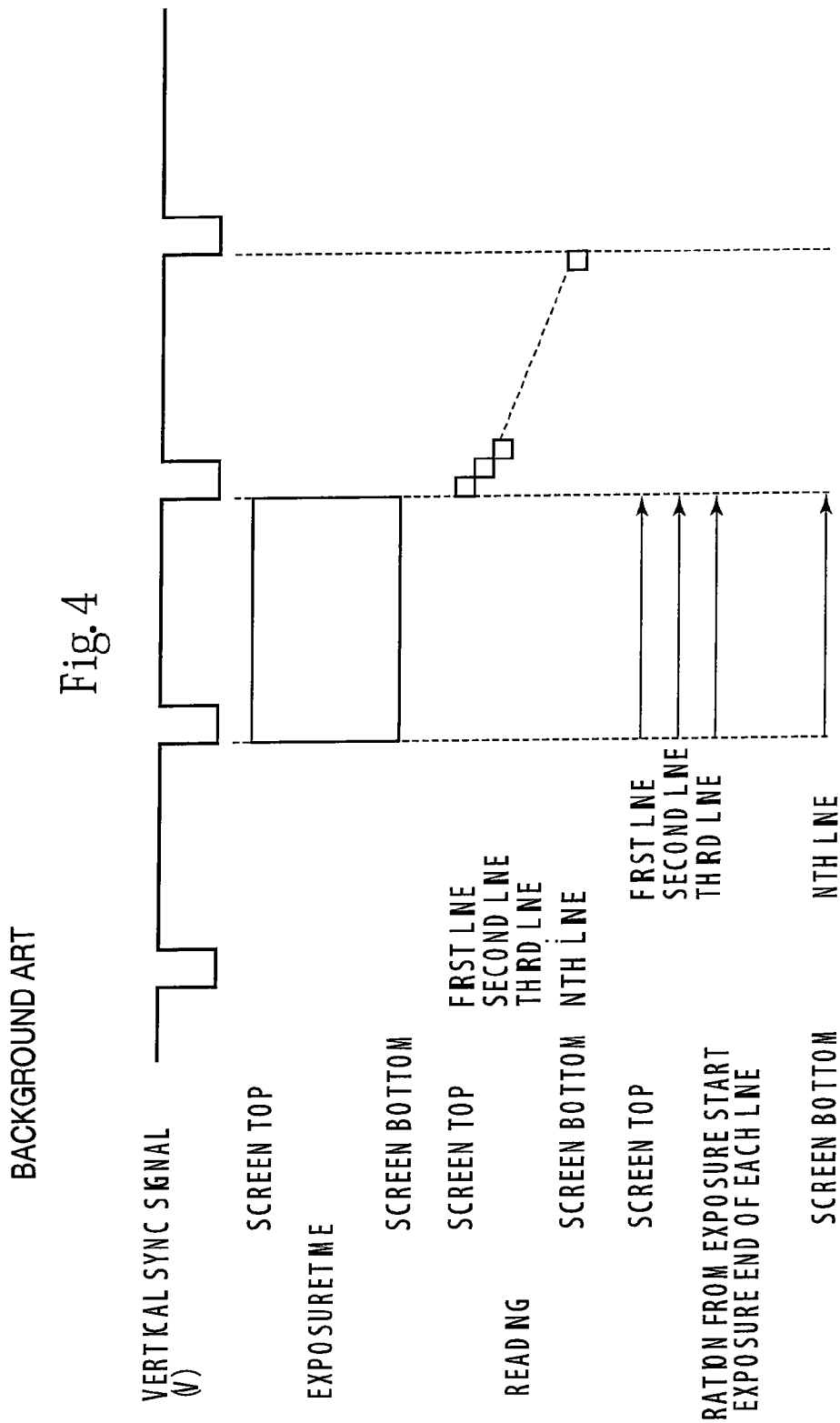
FIG. 4 is a timing chart showing an operation of the CCD image sensor.
Figure 5:
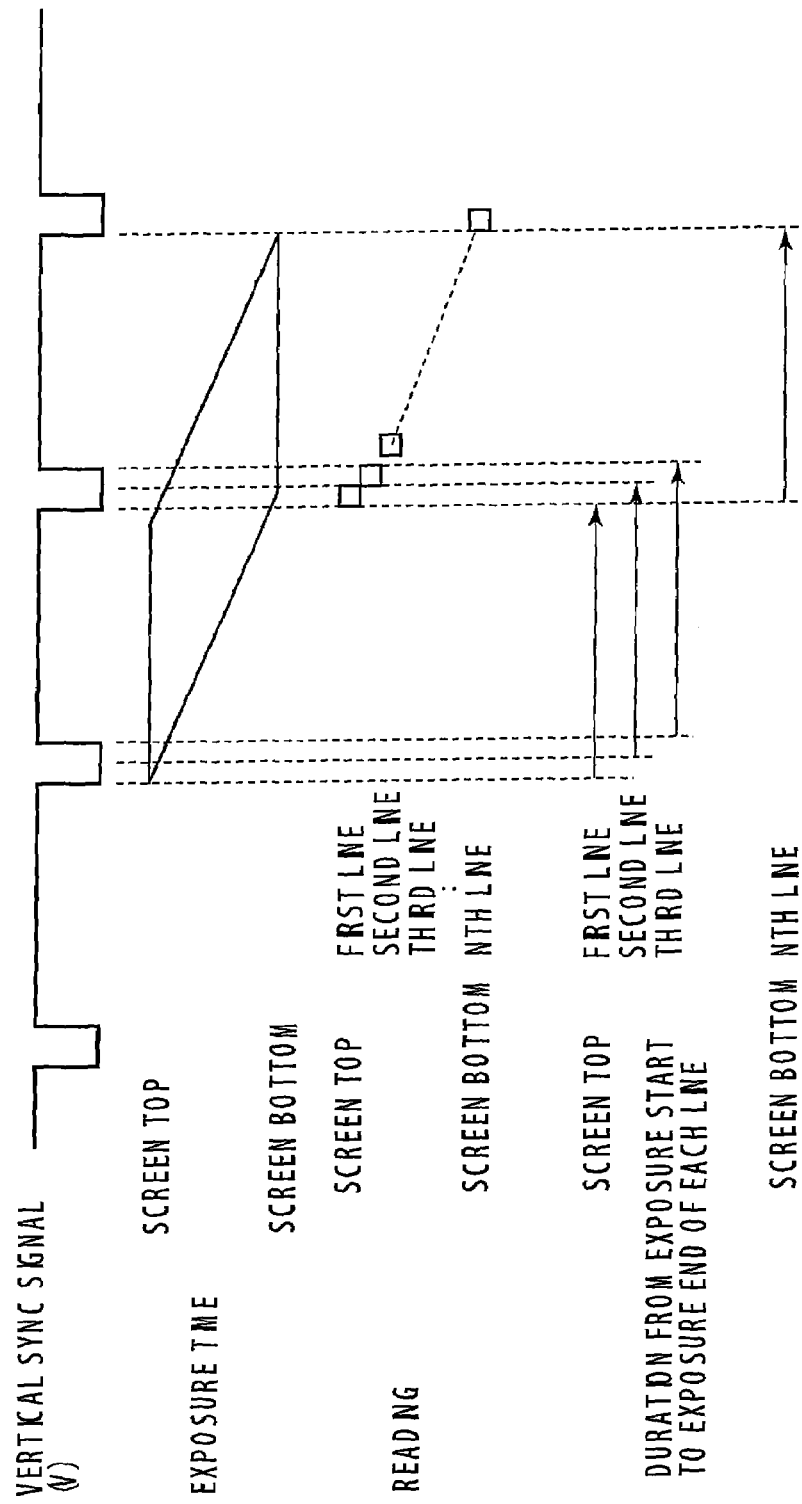
FIG. 5 is a timing chart showing an operation of the CMOS image sensor.

FIG. 4 is a timing chart showing an operation of the CCD image sensor, and FIG. 5 is a timing chart showing an operation of the CMOS image sensor.

As shown in FIG. 4, the exposure operation of the CCD image sensor is performed simultaneously for all the pixels 31. In the CMOS image sensor, due to the absence of the component corresponding to the V transfer registers 32 of the CCD image sensor, when a certain pixel 41 is read, other pixels are affected by ambient light, resulting in improper storage of charges. As shown in FIG. 5, in the CMOS image sensor, the exposure operation and the reading operation must have a certain relationship with each other for each pixel 41. In this example, a technique is employed to stagger the exposure start timing one line, for each pixel (each line) 41 in order to give all the pixels an equal exposure time.

Figure 6:
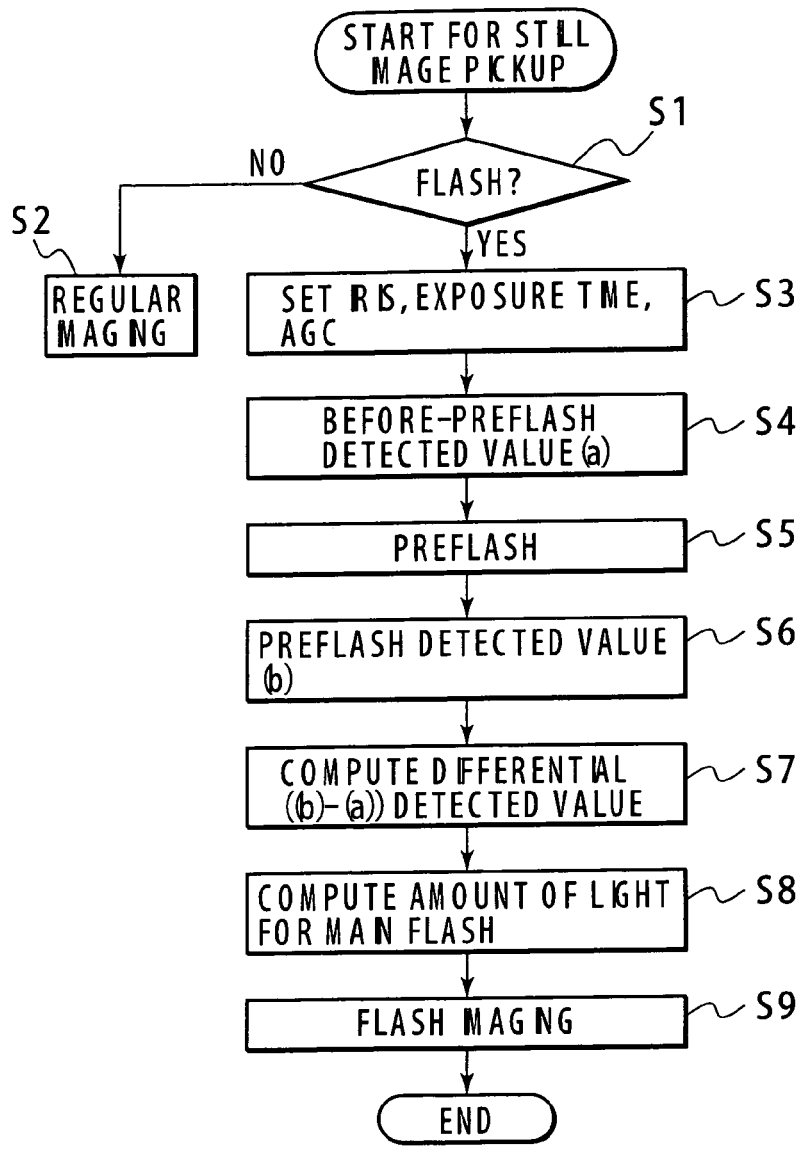
FIG. 6 is a diagram showing a control flow of flash imaging.

FIG. 6 is a diagram showing a control flow of flash imaging.

As shown in FIG. 6, when a still image pickup mode is selected, an integral of brightness signal levels contained in image signals generated by the image pickup device 13 is detected by the detector circuit 17, and whether ambient light is high or low is determined by the computation circuit 18 on the basis of the integral of the brightness signal levels (step S1). When it is determined that the ambient light is high, the process goes to step S2 to perform regular imaging without firing the flash 21. On the other hand, if it is determined in step S1 that the ambient light is low, the process goes to step S3 to perform flash imaging. Note that the process goes to step S3 to perform flash imaging regardless of the result of step S1 when an operating mode is available which forcibly performs flash imaging in any ambient light conditions.

For flash imaging, first, the aperture of the iris 12, the exposure time for the image pickup device 13 (shutter time), and the gain of the AGC 14 are set (step S3). The aperture of the iris 12 is preferably set such that light from a near-range object does not exceed the dynamic range of the image pickup device 13 during a preflash by the flash 21. Pre-flashing is a process intended to compute the amount of main-flashing light. And if light exceeding the dynamic range enters the image pickup device 13, distorted (saturated) video signals are produced, disabling accurate computation of the amount of light for main flashing. Moreover, the exposure time for the image pickup device 13 is preferably set as short as possible. A longer exposure time results in greater ambient light effects, which would narrow the dynamic range for detecting the amount of pre-flashing light, thus reducing computation accuracy for the amount of main-flashing light. The gain of the AGC 14 is preferably set to such a smaller value as to reduce noise effects in the video signals.

Next, while keeping the aperture, exposure time and gain settings, before-preflash exposure and reading operations are performed by the image pickup device 13 without firing the flash 21, and a before-preflash detected value (a), i.e., an integral of brightness signal levels contained in video signals is detected by the detector circuit 17, and stored in the memory unit 23. The before-preflash detected value (a) means a detected value of only ambient light without pre-flashed light (step S4).

Next, while still keeping the aperture, exposure time and gain settings, a preflash is fired by the flash 21 in a predetermined amount of light (step S5). Then, during-preflash exposure and reading operations are performed by the image pickup device 13, and a during-preflash detected value (b), i.e., an integral of brightness signal levels contained in video signals is detected by the detector circuit 17, and stored in the memory unit 23. The during-preflash detected value (b) means a detected value of pre-flashed light and ambient light (step S6).

Next, the during-preflash detected value (b) and the before-preflash detected value (a) stored in the memory unit 23 are read therefrom by the computation circuit 18 to compute a differential detected value obtained by subtracting the before-preflash detected value (a) from the during-preflash detected value (b). The differential detected value means a detected value containing only pre-flashed light with ambient light excluded (step S7). Next, an amount of light for main flashing by the flash 21 is computed by the computation circuit 18 on the basis of the differential detected value (step S8). Then, the flash 21 is fired in accordance with the amount of light computed, to perform flash imaging (step S9).

The before-preflash exposure operation in step S4 and the during-preflash exposure operation in step S6 by the image pickup device 13 are performed preferably as quickly as possible. Flash imaging is performed generally under low illumination, but almost never without ambient light. Moreover, for example, flash imaging is performed to highlight a person who is seen dark due to backlight. Such ambient light affects the obtaining of correct detected values, particularly, during-preflash detected values (b), and this may result in obtaining incorrect differential detected values.

Figure 7:
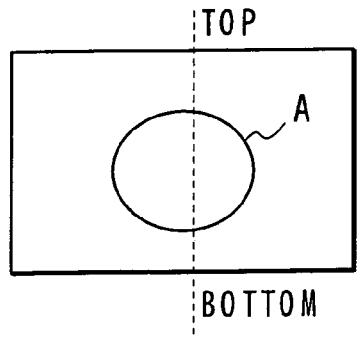
FIG. 7 is a diagram showing an example image of an object.

FIG. 7 is a diagram showing an example image of an object. Moreover, FIG. 8 is a diagram showing an example computation of a differential detected value under no ambient light, and FIG. 9 is a diagram showing an example computation of a differential detected value under ambient light.

A description will be given of a result of a computation made as to an output from the image pickup device, i.e., a differential detected value based on detected values. The output is taken at a position defined by the vertical dotted line shown in FIG. 7, when an image including a round image A in the middle of the screen shown in FIG. 7 is formed by flash imaging.

Figure 8:
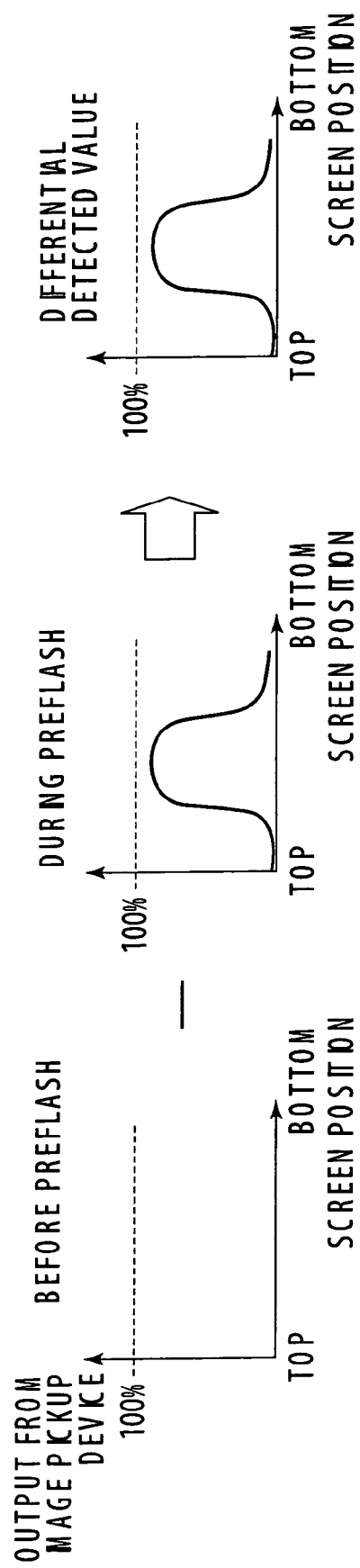
FIG. 8 is a diagram showing an example computation of a differential detected value under no ambient light.

As shown in FIG. 8, under no ambient light, the output from the image pickup device before firing a preflash is zero, and thus its before-preflash detected value (a) is also zero. At the time of the preflash, a during-preflash detected value (b) exhibiting a large output level for a portion corresponding to the image A is obtained. As a result, a differential detected value coincides with the during-preflash detected value (b).

Figure 9:
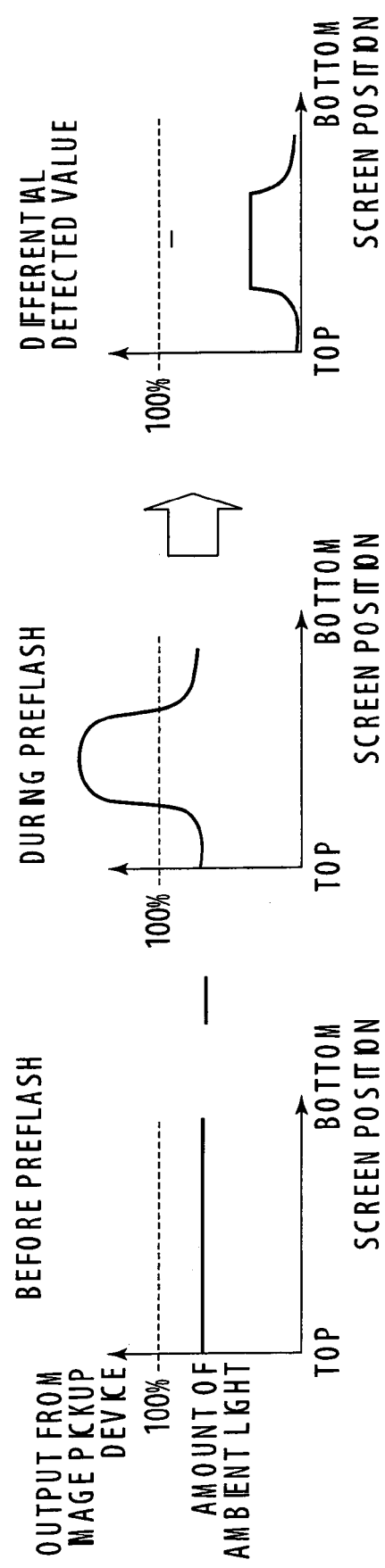
FIG. 9 is a diagram showing an example computation of a differential detected value under ambient light.

As shown in FIG. 9, under ambient light, a before-preflash detected value (a) corresponding to the ambient light is obtained. At the time of the preflash, the ambient light and pre-flashed light enter the image pickup device. At this moment, any brightness signal exceeding the 100% output level of the image pickup device, i.e., any brightness signal exceeding the dynamic range of the image pickup device is clipped. As a result, a differential detected value becomes smaller and distorted due to the clipped portion being excluded therefrom. Therefore, a correct amount of light for main flashing cannot be computed. As mentioned earlier, flash imaging under almost no ambient light is rarely performed. Consequently, the exposure operations before and during a preflash must be performed as quickly as possible to reduce the ambient light effects and thus to give a sufficient margin to the dynamic range of the image pickup device at the time of the preflash.

Figure 10:
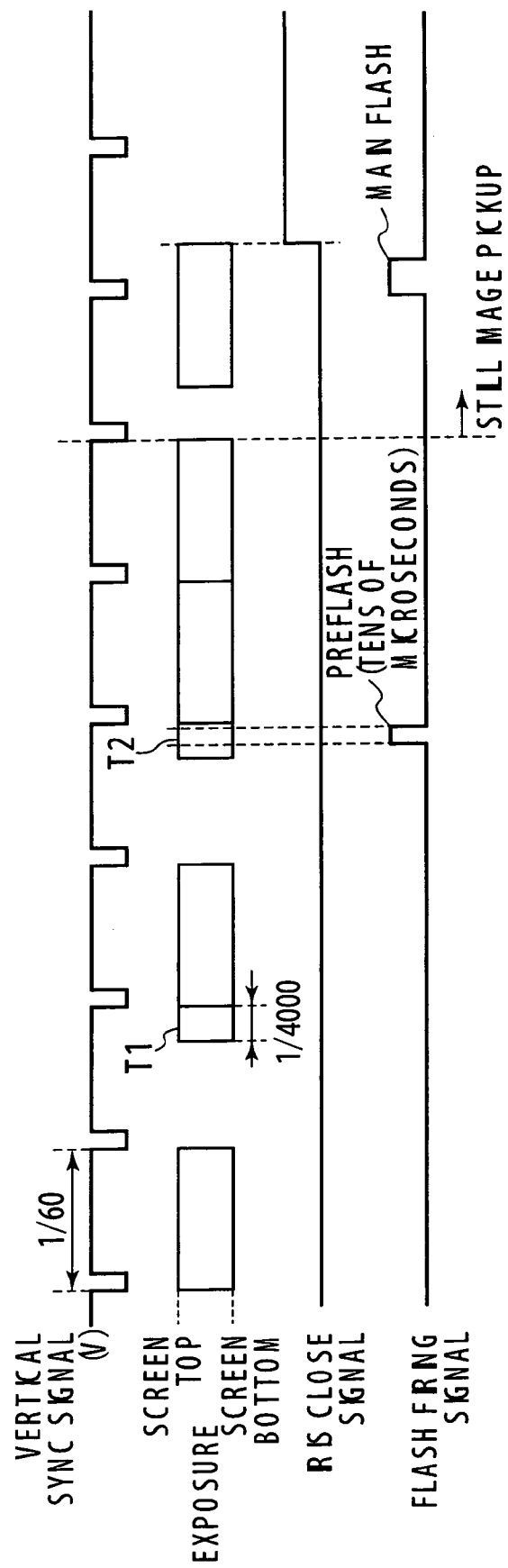
FIG. 10 is a diagram showing a flash imaging sequence for a still image by a conventional CCD sensor.
Figure 11:
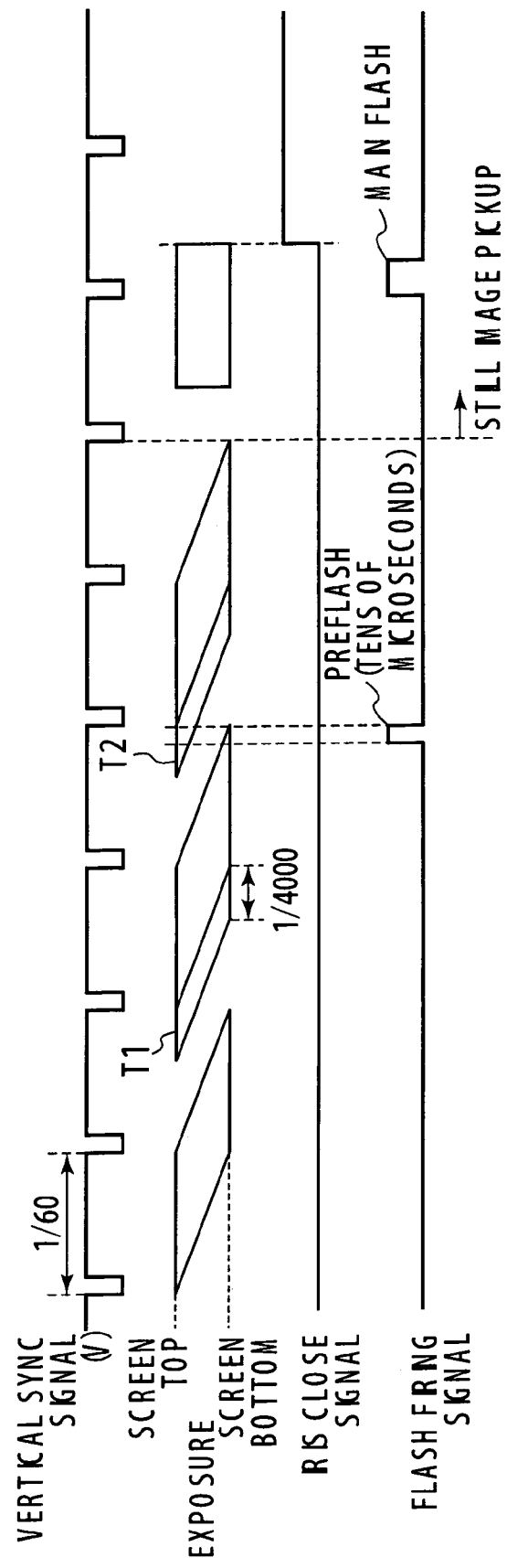
FIG. 11 is a diagram showing a flash imaging sequence for a still image by a conventional CMOS sensor.
Figure 12:
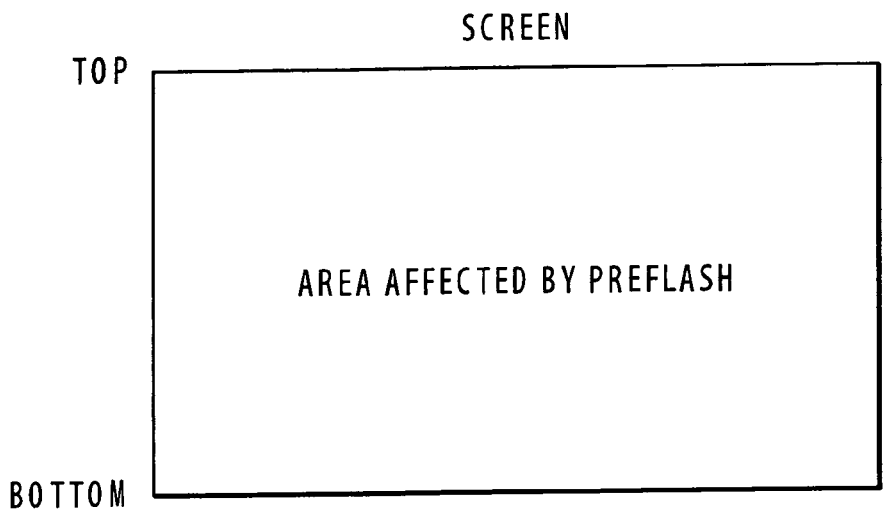
FIG. 12 is a diagram showing an image formed at the time of a preflash by the conventional CCD sensor.
Figure 13:
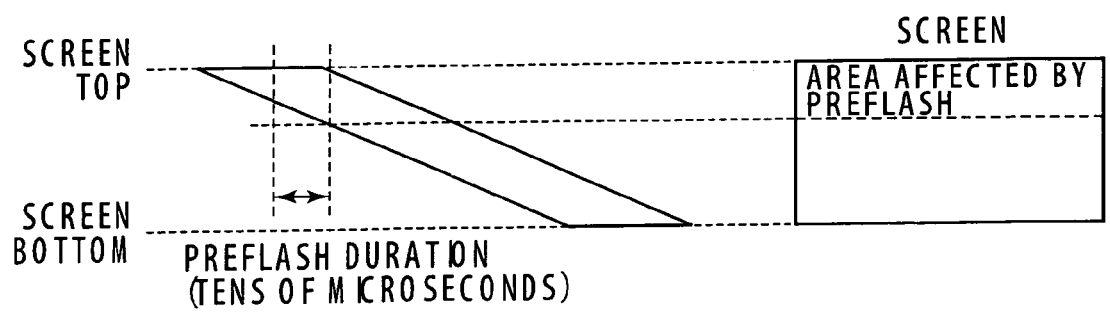
FIG. 13 is a diagram showing an image formed at the time of a preflash by the conventional CMOS sensor.

FIG. 10 is a diagram showing a flash imaging sequence for a still image by a conventional CCD sensor, and FIG. 11 is a diagram showing a flash imaging sequence for a still image by a conventional CMOS sensor. Moreover, FIG. 12 is a diagram showing an image formed at the time of a preflash by the conventional CCD sensor, and FIG. 13 is a diagram showing an image formed at the time of a preflash by the conventional CMOS sensor.

As shown in FIG. 10, when the conventional CCD sensor is used as the image pickup device, a before-preflash exposure is started at a time T1 and a during-preflash exposure is started at a time T2, in a moving image pickup mode. Detected values are obtained therefor, respectively, and their differential detected value is then computed. Subsequently, proceeding to the still image pickup mode, flash imaging by means of main flashing is performed. As shown in FIG. 12, pre-flashing in the during-preflash exposure affects the entire area of the screen evenly.

As shown in FIG. 11, even when the conventional CMOS sensor is used as the image pickup device, similarly, a before-preflash exposure is started at the time T1 and a during-preflash exposure is started at the time T2, in the moving image pickup mode. Detected values are obtained therefor, respectively, and their differential detected value is then computed. However, as shown in FIG. 13, the preflash duration is so short as 10 μsec that pre-flashing in the preflash exposure affects only a limited area (upper zone) of the screen. As a result, from the remaining area (middle and lower zones) of the screen, one obtains a detected value representing only ambient light, without preflash effects. Therefore, the during-preflash detected value cannot be obtained highly accurately, and hence the amount of light for main flashing cannot be computed highly accurately, either.

Figure 14:
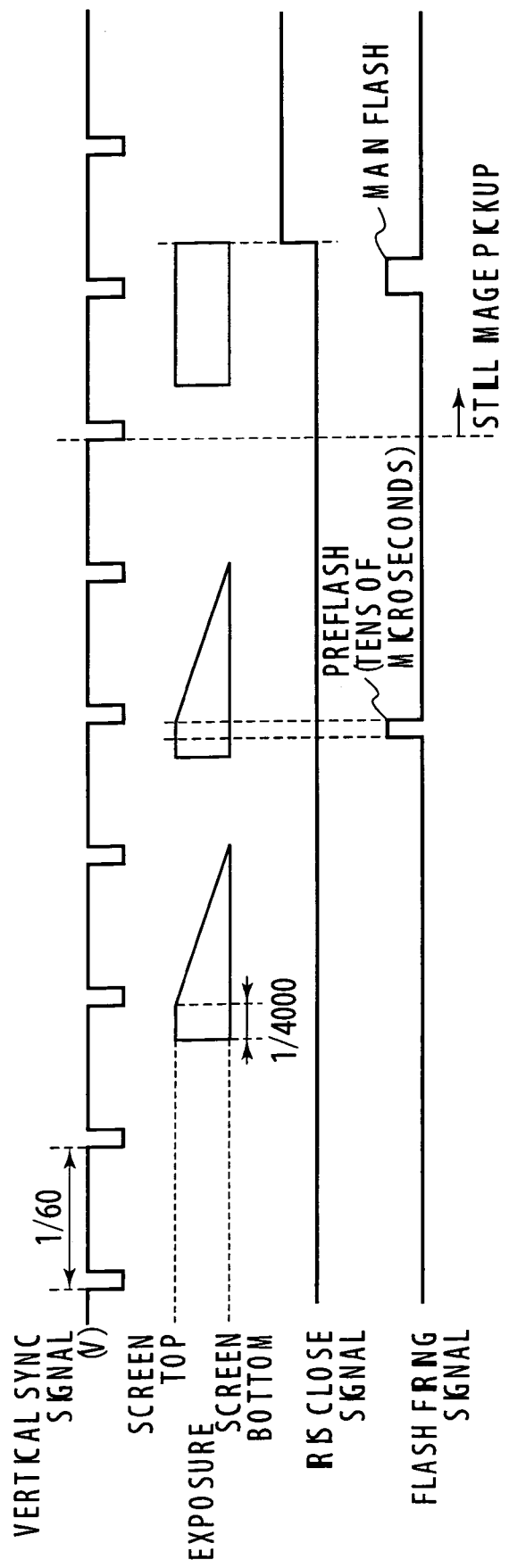
FIG. 14 is a diagram showing a flash imaging sequence for a still image by the CMOS sensor according to Embodiment 1.

FIG. 14 is a diagram showing a flash imaging sequence for a still image by the CMOS sensor according to Embodiment 1.

As shown in FIG. 14, for starting a before-preflash exposure and a during-preflash exposure, the imaging apparatus according to Embodiment 1 of the present invention sweeps away charges from all the pixels of its image pickup device 13, whereby the exposure operations are started simultaneously for all the pixels within the screen. Pre-flashing in the during-preflash exposure operation affects the entire screen evenly from top to bottom. Therefore, a during-preflash detected value can be obtained highly accurately. On the other hand, the imaging apparatus of the present invention cannot read all the pixels within the screen simultaneously, and thus, the pixels are sequentially read one line at a staggered timing. Before-preflash and during-preflash exposure times are designed to last longer for pixels in lower lines, thus exposing pixels in a first line for the shortest time (e.g., 1/4000 sec), and exposing pixels in a last line for the longest time (e.g., one over some hundreds of seconds).

The before-preflash and during-preflash exposure times differ from upper to lower zones of the screen. However, by setting shorter exposure times, the ambient light effects upon the during-preflash detected value can be reduced. Since preflashing is an operation originally intended to compute the amount of main-flashing light, the pre-flashing is acceptable as long as it allows for accurate detection of the amount of light reflected from an object during the preflash. Furthermore, the imaging apparatus according to Embodiment 1 detects a before-preflash detected value in addition to a during-preflash detected value, and subtracts the before-preflash detected value from the during-preflash detected value, to obtain their differential detected value containing only pre-flashed light with ambient light excluded. As a result, the difference between the exposure times applied to the upper and lower zones of the screen in the before-preflash and during-preflash exposures is cancelled, whereby a differential detected value can be obtained which contains only the pre-flashed light with ambient light excluded. Therefore, further more accurate differential detected values can be obtained, and further more accurate amounts of main-flashing light can be obtained.

Figure 15:
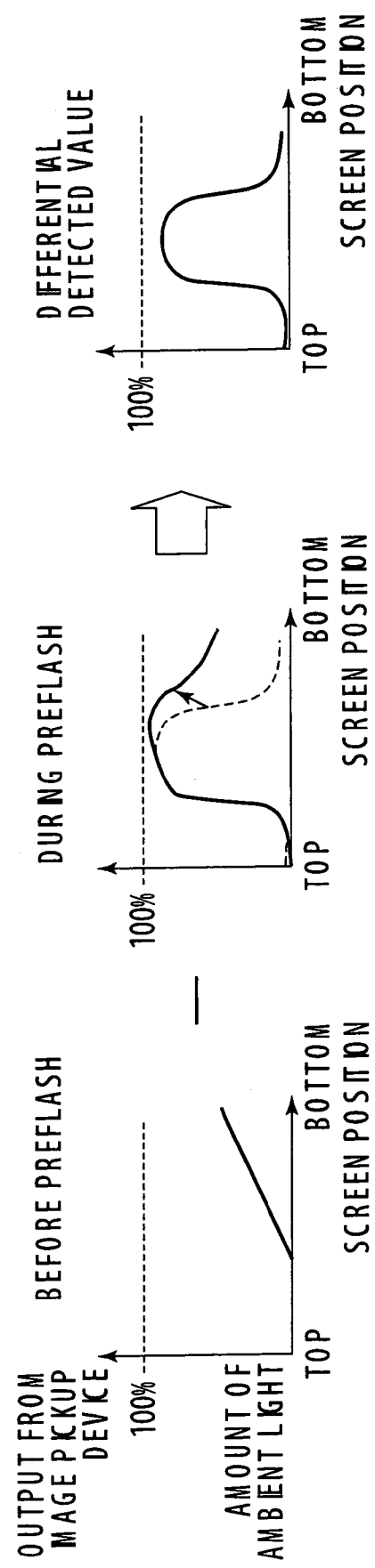
FIG. 15 is a diagram showing an example computation of a differential detected value in Embodiment 1.

FIG. 15 is a diagram showing an example computation of a differential detected value in Embodiment 1.

A description will be given of a result of a computation made as to an output from the image pickup device, i.e., a differential detected value based on detected values, similarly to the differential detected values shown in FIGS. 8 and 9. The output is taken at the position defined by the vertical dotted line shown in FIG. 7, when the image including the round image A in the middle of the screen shown in FIG. 7 is formed by flash imaging.

As shown in FIG. 15, before a preflash, pixels in the upper zone of the screen are exposed for so short a period as 1/4000 sec, and thus, the image output level is almost zero. And pixels positioned in lower lines of the screen have longer exposure times, and thus ambient light effects gradually grow large in the image output level. During the preflash, a portion corresponding to the image A produces a large output level, and is also affected by the ambient light. However, since the amount of ambient light contained in the incident light both before and during the preflash is smaller than the amount of pre-flashing light, and thus, one can obtain such an image output level as not to exceed the 100% output level of the image pickup device, i.e., the dynamic range of the image pickup device.

As described above, according to the imaging apparatus of Embodiment 1, during a preflash operation, an exposure operation is started simultaneously for all the pixels of the image pickup device 13 to form an image at the time of the preflash. Thus, the preflash effects can be extended over the entire area of the image pickup device, while reducing the exposure times for the image pickup device. Therefore, this is advantageous in obtaining the amount of main-flashing light with high accuracy. Moreover, the preflash time of the flash 21 is set to such a small value that the amount of light entering the image pickup device 13 does not exceed the dynamic range of the image pickup device 13. As a result, an undistorted image faithfully reproducing the amount of incident light can be formed by the image pickup device 13. Thus, this is also advantageous in obtaining the amount of main-flashing light with even higher accuracy.

Furthermore, by detecting a before-preflash detected value in addition to a during-preflash detected value, the before-preflash detected value is subtracted from the during-preflash detected value, to obtain their differential detected value containing only pre-flashed light with ambient light excluded. As a result, the differential detected value containing only the pre-flashed light with the ambient light excluded can be obtained. Consequently, this is further advantageous in obtaining the amount of main-flashing light with high accuracy.

Note that in FIG. 14, during a period in which before-preflash and during-preflash operations are performed by the image pickup device 13, output from the image pickup device 13 occurs at intervals of 2 Vs (every two vertical sync signals), providing only incomplete video signals (moving image). Additionally, affected by the difference in exposure time from one zone to another within the screen, a distorted video is outputted from the image pickup device during this period. In order to overcome this shortcoming, the following configuration may be implemented. That is, video signals generated at a timing some Vs ahead of this period are stored in the memory unit 23 beforehand, and when starting a before-preflash exposure operation, the image pickup device 13 reads the video signals generated at the timing some Vs ahead which have been stored in the memory unit 23, instead of an image to be formed by the image pickup device 13, and outputs the read video signals to a downstream image recording system or image output system. This permits a user to be unaware of distortions in the video.

INDUSTRIAL APPLICABILITY

According to the imaging apparatus of the present invention, during a preflash operation by a flash, an exposure operation is started simultaneously for all the pixels of the image pickup device, whereby preflash effects can be extended over the entire area of the image pickup device, while reducing the exposure times such that the amount of light entering the entire area of the image pickup device does not exceed the dynamic range of the image pickup device as much as possible. Consequently, this is advantageous in obtaining the amount of main-flashing light with high accuracy.

The invention claimed is:

1. An imaging apparatus, comprising:
   a flash for emitting light onto an object;
   an image pickup device formed from a plurality of pixels, each of which can perform any of an exposure operation and a reading operation thereof at a timing different from that of the other;
   a memory unit to store image information formed by said image pickup device before a pre-flash operation by the flash;
   a detector circuit for detecting a brightness of image information formed by the image pickup device, and
   a control circuit for controlling operations of the image pickup device and of the detector circuit, said control circuit causing the flash to fire the preflash before a main-flashing operation by the flash, causing the image pickup device to form an image at the time of the preflash, and causing the detector circuit to detect the brightness of image information formed at the time of the pre flash, to compute an amount of main-flashing light to be fired by said flash on the basis of the detected brightness of the image information formed at the time of the preflash, said control circuit starting the exposure operation simultaneously for all the pixels of said image pickup device at the time of the preflash by said flash, to form the image at the time of the preflash, wherein when said pickup device starts a during-preflash exposure operation, said control circuit causes said pickup device to read the image information which have been stored in said memory unit, instead of an image to be formed by said image pickup device at the time of the preflash, and outputs the read image information to an image recording apparatus or image output apparatus.

2. An imaging apparatus, comprising:

a flash for emitting light onto an object;

an image pickup device formed from a plurality of pixels, each of which can perform any of an exposure operation and a reading operation thereof at a timing different from that of the other, a memory unit to store image information formed by said image pickup device before a pre-flash operation by the flash;

a detector circuit for detecting a brightness of image information formed by the image pickup device;

a control circuit for controlling operations of the image pickup device and of the detector circuit, said control circuit causing the flash to fire a preflash before a main-flashing operation by the flash, causing the image pickup device to form an image at the time of the preflash, causing the detector circuit to detect the brightness of image information formed at the time of the preflash, causing the image pickup device to form a before-preflash image with said flash not fired before the preflash operation by said flash, and causing the detector circuit to detect the brightness of image information formed before the preflash, to compute a differential value obtained from the brightness of image information formed before the preflash and the brightness of image information formed during the preflash respectively detected by said detector circuit, and compute an amount of main-flashing light to be fired by the flash on the basis of the computed differential value;

wherein said control circuit causes starting the exposure operation simultaneously for all the pixels of said image pickup device before a preflash operation and during a preflash operation by said flash, to form the images before the preflash operation and during the preflash operation; and when said pickup device starts a before-preflash exposure operation, said control circuit causes said pickup device to read the image information which have been stored in said memory unit, instead of images to be formed by said image pickup device before the preflash and during the preflash, and outputs the read image information to an image recording apparatus or image output apparatus.

3. The imaging apparatus as described in claim 2, wherein said image pickup device comprises an XY addressable image sensor.

4. The imaging apparatus as described in claim 3, wherein said XY addressable image sensor comprises a CMOS image sensor.

* * * * *